United States Patent
Ehrlich et al.

(10) Patent No.: US 9,058,402 B2
(45) Date of Patent: Jun. 16, 2015

(54) CHRONOLOGICAL-PROGRESSION ACCESS PRIORITIZATION

(75) Inventors: Ofir Ehrlich, Tel Aviv (IL); Dima Potekhin, Tel Aviv (IL); Tomer Altman, Tel Aviv (IL); Leonid Fainberg, Qiryat (IL); Gil Shai, Giyataim (IL); Ofer Gadish, Rishon Le'Tzion (IL)

(73) Assignee: Limelight Networks, Inc., Tempe, AZ (US)

( * ) Notice: Subject to any disclaimer, the term of this patent is extended or adjusted under 35 U.S.C. 154(b) by 26 days.

(21) Appl. No.: 13/482,622

(22) Filed: May 29, 2012

(65) Prior Publication Data

US 2013/0326022 A1 Dec. 5, 2013

(51) Int. Cl.
*G06F 15/16* (2006.01)
*G06F 15/173* (2006.01)
*G06F 17/30* (2006.01)

(52) U.S. Cl.
CPC ............................. *G06F 17/30902* (2013.01)

(58) Field of Classification Search
USPC ......................................... 709/218–219, 224
See application file for complete search history.

(56) References Cited

U.S. PATENT DOCUMENTS

| | | | |
|---|---|---|---|
| 5,802,292 A | 9/1998 | Mogul | |
| 5,826,031 A | 10/1998 | Nielsen | |
| 5,894,554 A | 4/1999 | Lowery et al. | |
| 6,023,726 A | 2/2000 | Saksena | |
| 6,055,572 A | 4/2000 | Saksena | |
| 6,067,565 A | 5/2000 | Horvitz | |
| 6,085,226 A | 7/2000 | Horvitz | |
| 6,098,064 A | 8/2000 | Pirolli et al. | |
| 6,272,534 B1 | 8/2001 | Guha | |
| 6,338,096 B1 | 1/2002 | Ukelson | |
| 6,385,641 B1 | 5/2002 | Jiang et al. | |

(Continued)

FOREIGN PATENT DOCUMENTS

KR 10-2012-0016333 2/2012

OTHER PUBLICATIONS

Mor, "Evaluation of Delivery Techniques for Dynamic Web Content", Retrieved on Jul. 2, 2012, http://infolab.stanford.edu/~mor/research/eodposter.pdf, pp. 1-2.

(Continued)

*Primary Examiner* — Minh-Chau Nguyen
(74) *Attorney, Agent, or Firm* — Kilpatrick Townsend & Stockton LLP

(57) ABSTRACT

In some embodiments of the invention, a system for serving dynamic content objects is provided. The system includes a request fulfiller that: receives a request for a webpage from an end-user system, retrieves a content file associated with the requested webpage, and transmits a modified content file to the end-user system. The system further includes a content-file modifier that generates the modified content file, the content-file modifier including: a dynamic-code detector that detects that the retrieved content file comprises or is associated with a dynamic code; and a reporting-code injector that injects a reporting code into the retrieved content file or an associated content file to produce the modified content file, the reporting code including instructions to report data identifying usage characteristics of one or more content objects. A high-priority content object is identified based on the reported data, and access to the high-priority content object is improved.

15 Claims, 11 Drawing Sheets

(56) References Cited

U.S. PATENT DOCUMENTS

| | | |
|---|---|---|
| 6,553,393 B1 | 4/2003 | Eilbott et al. |
| 6,578,073 B1 | 6/2003 | Starnes et al. |
| 6,657,647 B1 | 12/2003 | Bright |
| 6,665,658 B1 | 12/2003 | DaCosta et al. |
| 6,799,214 B1 | 9/2004 | Li |
| 6,834,297 B1 | 12/2004 | Peiffer et al. |
| 6,938,212 B2 | 8/2005 | Nakamura |
| 6,993,591 B1 | 1/2006 | Klemm |
| 7,007,237 B1 | 2/2006 | Sharpe |
| 7,012,612 B1* | 3/2006 | O'Neill et al. ............... 345/557 |
| 7,084,877 B1 | 8/2006 | Panusopone et al. |
| 7,100,111 B2 | 8/2006 | McElfresh et al. |
| 7,107,338 B1 | 9/2006 | Nareddy et al. |
| 7,113,935 B2 | 9/2006 | Saxena et al. |
| 7,240,100 B1 | 7/2007 | Wein et al. |
| 7,243,309 B2 | 7/2007 | Koay et al. |
| 7,249,196 B1 | 7/2007 | Peiffer et al. |
| 7,308,490 B2 | 12/2007 | Peiffer et al. |
| 7,373,599 B2 | 5/2008 | McElfresh et al. |
| 7,483,941 B2 | 1/2009 | Carlson et al. |
| 7,594,003 B2 | 9/2009 | Davidson et al. |
| 7,594,013 B2 | 9/2009 | Wang et al. |
| 7,636,770 B2 | 12/2009 | Bennett et al. |
| 7,689,663 B2 | 3/2010 | Kinnan et al. |
| 7,814,172 B2 | 10/2010 | Martin et al. |
| 7,818,686 B2 | 10/2010 | Cooke |
| 7,860,881 B2 | 12/2010 | Haselden et al. |
| 7,886,218 B2 | 2/2011 | Watson |
| 7,941,483 B2 | 5/2011 | Narayanan et al. |
| 7,958,232 B1 | 6/2011 | Colton et al. |
| 8,060,518 B2 | 11/2011 | Timmons |
| 8,112,703 B2 | 2/2012 | Kumar et al. |
| 8,122,102 B2 | 2/2012 | Wein et al. |
| 8,166,079 B2 | 4/2012 | Lewin et al. |
| 8,219,633 B2 | 7/2012 | Fainberg et al. |
| 8,250,457 B2 | 8/2012 | Fainberg et al. |
| 8,745,058 B1* | 6/2014 | Garcia-Barrio ............... 707/737 |
| 2002/0063714 A1 | 5/2002 | Haas et al. |
| 2002/0078087 A1 | 6/2002 | Stone |
| 2002/0078165 A1 | 6/2002 | Genty et al. |
| 2003/0101412 A1 | 5/2003 | Eid |
| 2004/0030717 A1 | 2/2004 | Caplin |
| 2004/0088375 A1 | 5/2004 | Sethi et al. |
| 2004/0215665 A1 | 10/2004 | Edgar et al. |
| 2004/0225562 A1 | 11/2004 | Turner |
| 2005/0044491 A1 | 2/2005 | Peterson |
| 2005/0138143 A1* | 6/2005 | Thompson ............... 709/218 |
| 2005/0154781 A1 | 7/2005 | Carlson et al. |
| 2005/0198191 A1 | 9/2005 | Carlson et al. |
| 2006/0093030 A1 | 5/2006 | Francois et al. |
| 2006/0218305 A1 | 9/2006 | Kinnan et al. |
| 2007/0022102 A1 | 1/2007 | Saxena |
| 2007/0156845 A1 | 7/2007 | Devanneaux et al. |
| 2007/0208610 A1 | 9/2007 | Pisaris-Henderson et al. |
| 2007/0256003 A1 | 11/2007 | Wagoner et al. |
| 2007/0260748 A1 | 11/2007 | Talkington |
| 2008/0005672 A1 | 1/2008 | Mestres et al. |
| 2008/0139191 A1 | 6/2008 | Melnyk et al. |
| 2008/0155425 A1 | 6/2008 | Murthy et al. |
| 2008/0178302 A1* | 7/2008 | Brock et al. ............... 726/32 |
| 2008/0195712 A1 | 8/2008 | Lin et al. |
| 2008/0228772 A1* | 9/2008 | Plamondon ............... 707/10 |
| 2008/0228911 A1* | 9/2008 | Mackey ............... 709/224 |
| 2009/0037454 A1 | 2/2009 | Sampson et al. |
| 2009/0125481 A1 | 5/2009 | Mendes da Costa et al. |
| 2009/0240698 A1 | 9/2009 | Shukla et al. |
| 2009/0241229 A1 | 9/2009 | Andersen et al. |
| 2009/0300111 A1 | 12/2009 | Rana |
| 2010/0017696 A1 | 1/2010 | Choudhary et al. |
| 2010/0149091 A1 | 6/2010 | Kota et al. |
| 2010/0169455 A1 | 7/2010 | Gorham |
| 2010/0269050 A1 | 10/2010 | Kirkby et al. |
| 2010/0281357 A1 | 11/2010 | Fu et al. |
| 2010/0299589 A1 | 11/2010 | Yamada |
| 2010/0306643 A1 | 12/2010 | Chabot et al. |
| 2011/0029641 A1 | 2/2011 | Fainberg et al. |
| 2011/0029899 A1 | 2/2011 | Fainberg et al. |
| 2011/0066676 A1 | 3/2011 | Kleyzit et al. |
| 2011/0087966 A1 | 4/2011 | Leviathan et al. |
| 2011/0113000 A1 | 5/2011 | Marlow |
| 2011/0125783 A1* | 5/2011 | Whale et al. ............... 707/769 |
| 2011/0289486 A1 | 11/2011 | Revinskaya et al. |
| 2012/0030224 A1 | 2/2012 | Cohen et al. |
| 2012/0054595 A1 | 3/2012 | Mylroie et al. |
| 2012/0066586 A1* | 3/2012 | Shemesh ............... 709/217 |
| 2012/0079057 A1 | 3/2012 | Fainberg et al. |
| 2012/0226766 A1 | 9/2012 | Fainberg et al. |

OTHER PUBLICATIONS

Bartolini, "A Walk through Content Delivery Networks", Retrieved on Jul. 4, 2012 from http://wwwusers.di.uniroma1.it/~novella/articoli/CDN_tutorial.pdf, 2012, 25 pages.

Bogdanov, D., et al., "A prototype of online privacy-preserving questionnaire system," retrieved from http://courses.cs.ut.ee/2010/security-seminar-spring/uploads/Main/talviste-draft.pdf on Jul. 27, 2012, 6 pages.

Chen, G., et al., "Building a Scalable Web Server with Global Object Space Support on Heterogeneous Clusters," Third IEEE International Conference on Cluster Computing (Cluster'01), 2001, 8 pages.

Gardner, P., et al., "DOM: Towards a Formal Specification," 2010, 6 pages.

Jansen, "Guidelines on Active Content and Mobile Code", Retrieved on Jul. 4, 2012 from http://csrc.nist.gov/publications/nistpubs/800-28-ver2/SP800-28v2.pdf, NIST Special Publication 800-28 Version 2, Mar. 2008, 62 pages.

Jing, J., et al., "Client Server Computing in Mobile Environments," ACM Computing Surveys, Jun. 1999, pp. 117-157, vol. 31, No. 2.

Rayburn, "How Dynamic Site Acceleration Works, What Akamai and Cotendo Offer", Retrieved on Jul. 4, 2012 from http://blog.streamingmedia.com/the_business_of_online_vi/2010/10/how-dynamic-site-acceleration-works-what-akamai-and-cotendo-offer.html, Oct. 18, 2010, 4 pages.

Seifert, C., et al., "Identification of Malicious Web Pages with Static Heuristics," Australasian, Telecommunication Networks and Applications Conference, ATNAC 2008, 2008, pp. 91-96.

Wikipedia, "Web Accelerator", Retrieved on Jul. 4, 2012 from http://en.wikipedia.org/wiki/Web_accelerator, pp. 1-3.

* cited by examiner

CHRONOLOGICAL-PROGRESSION ACCESS PRIORITIZATION

BACKGROUND

This disclosure relates in general to serving requests for dynamic webpages and, but not by way of limitation, to accelerating serving requests for dynamic webpages with client-side scripting.

Dynamic webpages allow programmers to tailor web pages for specific instances or viewers. Scripts may be executed on a client or server side, and the execution of the scripts may influence the appearance, content and/or functionality of a resulting webpage. Programmers may utilize this flexibility to attempt to provide relevant content, pleasing displays, and useful features in a semi-customized manner. However, this flexibility also results in a lack of predictivity. Even if a same user requests a same webpage, the webpage displayed in a first instance may be drastically different as compared to the webpage displayed in a second instance.

SUMMARY

In one embodiment, the present disclosure provides a system and method for accelerating loading of dynamic webpages. A request for content file may be received from an end user system. The requested content file may be associated with a dynamic web page. The content file may be accessed and modified to include a reporting function. The modified content file is then transmitted to the requesting end user system. Subsequently, reports are received from the end user system that indicate characteristics of the dynamic web page. For example, the reports may identify parameters received by a client-side dynamic script or features of the web page as presented to the user (e.g., aesthetic features, content features, or functionality features).

The reports may be collected and aggregated, e.g., across users, and it may be determined which web-page features, content and/or functionalities are frequently utilized and how quickly subsequent to initial page loading. Based on this analysis, web-page features may be prioritized and acceleration techniques may be implemented to accelerate serving similar future requests. For example, content objects (e.g., images, HTML code portions, or Javascripts) may be prioritized based on which content objects were viewed or used first and/or frequently. High-priority objects may be pre-fetched and/or cached near the end user system (e.g., at an edge server), high-priority objects may be quickly or immediately transmitted to an end user system prior to receiving a request for the objects, codes may be modified to inline or embed high-priority content objects, portions of a content file may be rearranged and/or segmented, etc.

In some embodiments, a system is provided. for serving dynamic content objects to end user systems. A request fulfiller receives a request for a webpage from an end-user system, retrieves a content file associated with the requested webpage, and transmits a modified content file to the end-user system. A content-file modifier generates the modified content file. The content-file modifier includes a dynamic-code detector that detects that the retrieved content file comprises or is associated with a dynamic code; and a reporting-code injector that injects a reporting code into the retrieved content file or an associated content file to produce the modified content file, the reporting code including instructions to report data identifying usage characteristics of one or more content objects. An object-usage analyzer analyzes the reported data. An object prioritizor that identifies a high-priority content object based at least in part on the analysis. An access improver that improves access of at least one end-user system to the high-priority content object.

In some embodiments, a method is provided for serving content objects. A plurality of reports are received from a plurality of end-user systems, each report of the plurality of reports identifying one or more content objects presented or executed within a same dynamic webpage at a respective end-user system. Data from the plurality of reports is aggregated, wherein the aggregated data comprises an object-usage statistic. A content object of high priority is identified based at least in part on the object-usage statistic. An end-user system's access to the content object of high priority is improved, such that a time between a subsequent request for a Hypertext Transfer Protocol file associated with the dynamic webpage and an availability of the content object to the end-user system is reduced.

In some embodiments, a method is provided for responding to a request for a webpage. A request for a content file associated with a webpage is received from an end user system. The content file is retrieved. A detection that the webpage includes a dynamic webpage is made. A reporting function is injected into the content file or into another content file associated with the content file, the reporting function including instructions to collect and report data characterizing dynamic presentation or execution of content objects, the dynamic presentation of execution of the content objects being coordinated at the end-user system. The content file or another content file is transmitted to the end-user system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the invention as set forth in the appended claims.

In one embodiment, the present disclosure provides a system and method for accelerating loading of dynamic webpages. A request for content file may be received from an end user system. The requested content file may be associated with a dynamic web page. The content file may be accessed and modified to include a reporting function. The modified content file is then transmitted to the requesting end user system. Subsequently, reports are received from the end user system that indicate characteristics of the dynamic web page. For example, the reports may identify parameters received by a client-side dynamic script or features of the web page as presented to the user (e.g., aesthetic features, content features, or functionality features).

The reports may be collected and aggregated, e.g., across users, and it may be determined which web-page features, content and/or functionalities are frequently utilized and how quickly subsequent to initial page loading. Based on this analysis, web-page features may be prioritized and acceleration techniques may be implemented to accelerate serving similar future requests. For example, content objects (e.g., images, HTML code portions, or Javascripts) may be prioritized based on which content objects were viewed or used first and/or frequently. High-priority objects may be pre-fetched and/or cached near the end user system (e.g., at an edge server), high-priority objects may be quickly or immediately transmitted to an end user system prior to receiving a request for the objects, codes may be modified to inline or embed high-priority content objects, portions of a content file may be rearranged and/or segmented, etc.

Figure 1:
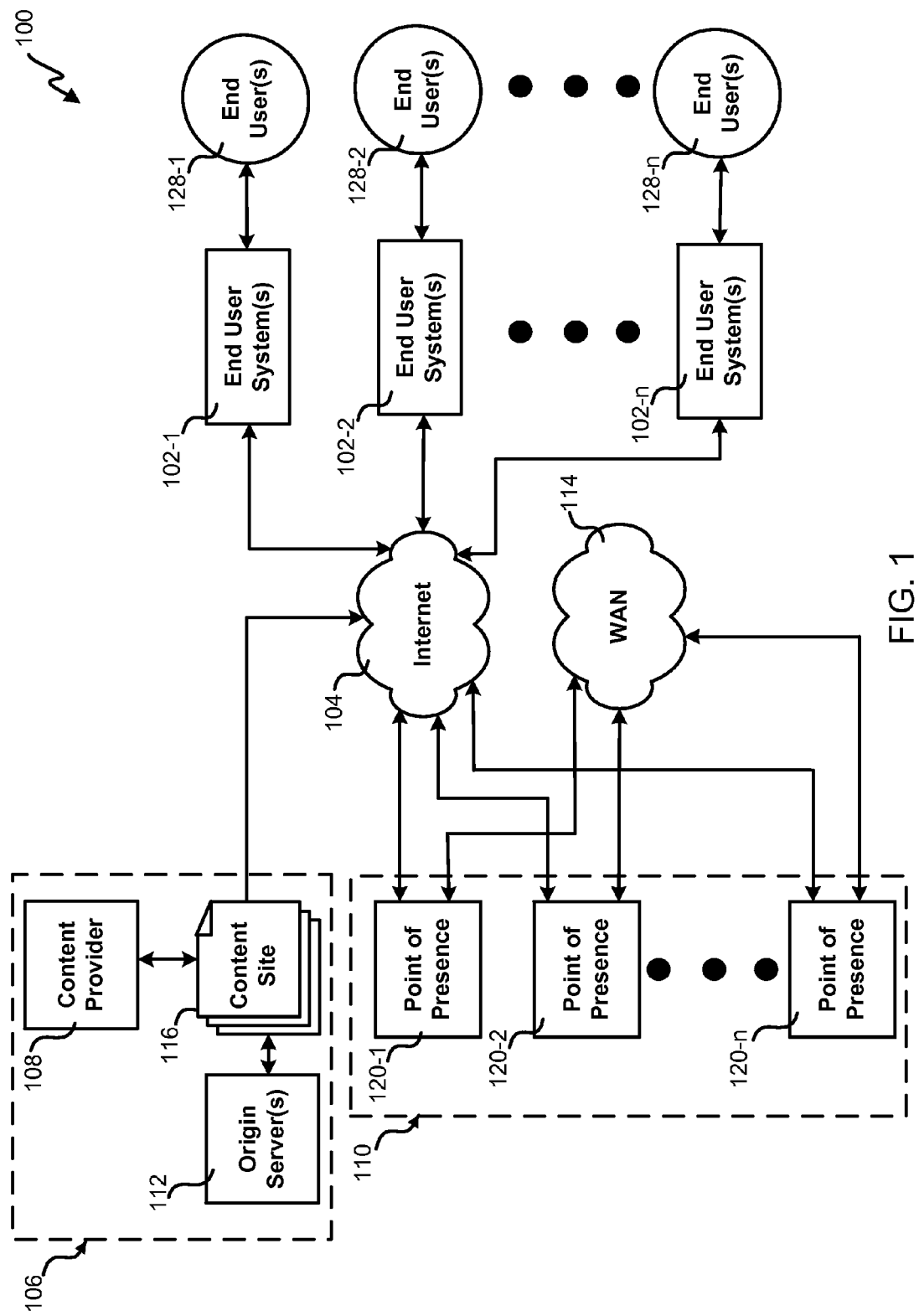
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically and efficiently serve webpages and objects (e.g., Javascript applets, images, videos, Flash animations, etc.) over the Internet 104 to end user systems 102 by determining characteristics of presented web pages and improving access to frequently used web page features. For example, a function (e.g., a document-.write or document.writeln function) or source code may be modified to include a reporting function that identifies what is displayed to a user, such that frequently presented or quickly presented web-page features may be identified. Frequently or quickly presented content objects may be cached, immediately provided, embedded, inlined, etc. Source code and/or style sheets may further be modified, e.g., to reduce uncertainties, decision points, etc.

An end user may request a webpage, by e.g., entering a Uniform Resource Identifier or Uniform Resource Locator. The requested webpage may be associated with one or more files and/or objects, such as one or more source files (e.g., Hypertext Transfer files, files in a markup language, HTML files, dynamic HTML files, etc.). The one or more source files may include or reference (e.g., call) one or more scripts, such as one or more Javascripts. The scripts may be configured such that a result of the script is dynamically presenting a user with content, a functionality, display features, etc. For example, the scripts may include or call a document.write or document.writeln function, and content may be dynamically selected from a set of available content, dynamically generated (e.g., based on user input), dynamically requested from a server, etc.

Due to the dynamic capabilities of the script, a server responding to the request may have difficulty or be unable to identify features that may be used to generate the webpage. For example, it may be unaware that a script referenced or included in a source file will subsequently request an image. As described in greater detail below, some embodiments of the present invention relate to modifying files transmitted to an end user system, such that the end user system reports features about the dynamic generation of the webpage and/or features of the webpage as presented to the user. This data may then reveal frequently or quickly used content features.

A content originator 106 produces and/or distributes content objects as the originator of content in a digital form for distribution with the Internet 104. Included in the content originator 106 are a content provider 108, a content site 116 and an origin server 112. The figure shows a single origin server 112, but it is to be understood embodiments could have multiple origin servers 112 that each can serve streams of the content object redundantly. For example, the content originator 106 could have multiple origin servers 112 and assign any number of them to serve the content object.

Although, this figure only shows a single content originator 106 and a single CDN 110, there may be many of each in other embodiments. The content object is any content file or content stream and could include, for example, video, pictures, advertisements, applet, data, display characteristic (e.g., font, background, spacing), audio, software, and/or text. The content object could be live, delayed or stored. Thus, each content feature may be associated with one or more content files or file portions, such as an image file, audio file, video file, markup-language file (e.g., HTML file) or file portion, or style sheet file (e.g., CSS file) or file portion. Throughout the specification, references may be made to a content object, content and/or content feature, but it is to be understood that those terms could be generally used interchangeably wherever they may appear. Additional reference may be made to a content file. Generally, a content file may define a content object, content and/or content feature, though in some instances these terms may be used synonymously. For example, requesting a content object or requesting a content file associated with the content object may be used interchangeably.

Many content providers 108 use the CDN 110 to deliver the content objects over the Internet 104 to end users 128. When a content object is requested by an end user 128, the CDN 110 may retrieve the content object from the content provider 108. Alternatively, the content provider 108 may directly provide the content object to the CDN 110, i.e., in advance of the first request or in servicing the first request. In this embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 102. A wide area network (WAN) 114 or other backbone may couple the POPs 120 with each other and also couple the POPs 120 with other parts of the CDN 110. Other embodiments could couple POPs 120 together with the Internet optionally using encrypted tunneling.

When an end user 128 requests a content link through its respective end user system 102, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content site 116 is accessed through a content web site 116 in this embodiment by the end user system 102. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment.

Once the request for content is passed to the CDN 110, the request is associated with a particular POP 120 within the CDN 110. A routing algorithm used to choose between different POPs 120 could be based upon efficiency, randomness, and/or proximity in Internet terms, defined by the fabric of the Internet and/or some other mechanism. The particular POP 120 then assigns or routes the request to an edge server. The particular POP 120 may retrieve the portion of the content object from the content provider 108. Alternatively, the content provider 108 may directly provide the content object to the CDN 110 and its associated POPs 120, i.e., in advance of the first request. In this embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

An edge server serving the request may access the requested content—either by locally retrieving part or all of the content (e.g., from a local cache) or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If part or all of the content cannot be found in the POP 120 originally receiving the request, neighboring POPs 120 could serve as the source in some cases, or the content could be sourced from the content originator 106.

Thus, a request from an end user system 102 for content may result in requests for content from one or more servers in the CDN 110. A CDN server (e.g., an edge server, peer servers, an origin server, etc.) may analyze requested content files (e.g., requested HTML files), modify the requested content files (e.g., to include reporting functions, embed or inline content objects, or modify scripts within or referenced within the content files), and transmit the modified requested content objects in response to the requests.

The end user system 102 processes the content for the end user 128 upon receipt of the content object. The end user system 102 could be a personal computer, media player, handheld computer Internet appliance, phone, IPTV set top, streaming radio or any other device that can receive and play content objects. In some embodiments, a number of end user systems 102 can be networked together sharing a single connection to the Internet 104. Although this embodiment only shows a single content originator 106 and a single CDN 110, it is to be understood that there could be many of each in various embodiments.

Figure 2:
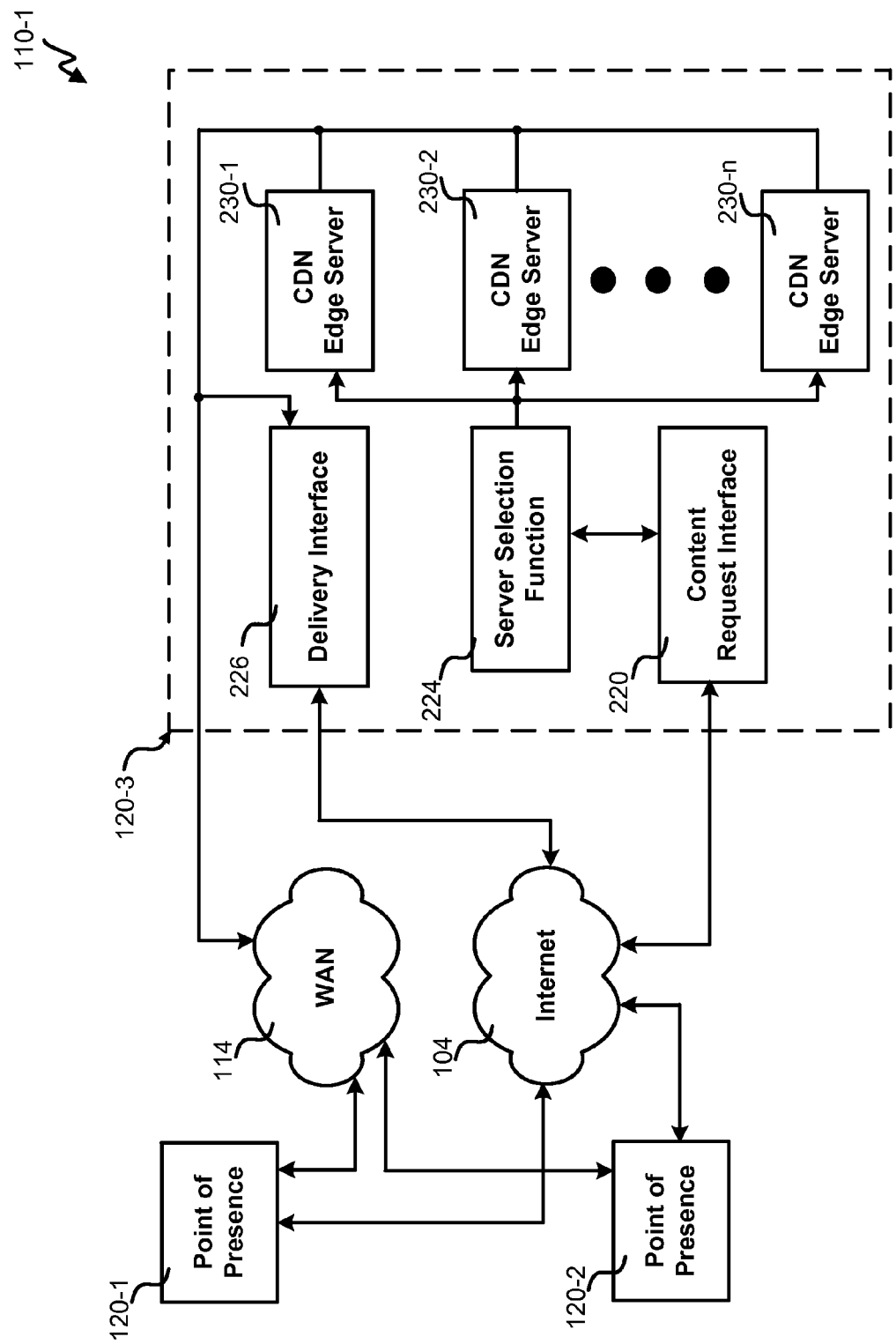
FIG. 2 depicts block diagrams of embodiments of a content delivery network (CDN) coupled to the Internet.

Referring next to FIG. 2, a block diagram of an embodiment of the CDN 110-1 is shown coupled to the Internet 104 with additional detail for one of the POPs 120. Each POP 120 may include a content request interface 220, a server selection function 224, a delivery interface 226, a number of CDN edge servers 230, and other servers (not shown). For simplicity, this embodiment only shows three POPs 120 within the CDN 110, however any number of POPs may exist in various embodiments.

As explained above in relation to FIG. 1, when a request for content is handed over to the CDN 110, the request is associated with a particular POP 120 within the CDN 110 using any number of algorithms. For example, the assignment could be round-robin, random, based upon loading of the edge server, distance between POP and end user, and/or other algorithms. The particular POP 120 receives the request through a content request interface 220 and distributes the request to the server selection function 224. The server selection function 224 assigns the request for content to an edge server 230 to stream the content object to the end user system 102. The server selection function 224 selects the edge server 230 from a group of edge servers 230 in the POP 120. A number of algorithms can be used to assign the request to an edge server 230. For example, the server selection function 224 may use routing algorithms, domain name service (DNS) resolution or an HTTP-redirect to direct a particular end user system 102 to a particular edge server 230.

Various parameters may be taken into account for selection of the edge server 230. Examples of parameters influencing selection of the particular edge server may include content object characteristics, server assignment to a particular content provider, adequate quality of service (QoS), performance metrics, capabilities of the edge server 230, and/or routing efficiency between the edge server 230 and end user system 102. Embodiments could have any number of edge servers 230 within each POP 120 of the CDN 110.

When the request for content is assigned to the edge server 230, the edge server 230 may determine a source for part of all of the requested object (e.g., a content file and/or associated content objects). The content source(s) may be determined using one or more techniques. For example, a publishing point mapping content to one or more paths where the content can be found may be identified and/or a peer-discovery algorithm may be implemented. In some embodiments, a content source may be determined by, e.g., querying a content registrar or distributed registrar. The content registrar may receive reports from edge servers in a plurality of POPs, and the distributed registrar may receive reports from edge servers in a particular POP. One or both registrars may be queried to identify where content is stored within the CDN. The content source(s) may include, e.g., the edge server 230 itself, a peer server or the content provider 108 or any other server with the content.

Some embodiments select one of the edge servers 230 to serve a particular content object for all requests in the POP 120. Where the edge server 230 receiving the request serves the content from a source external to its POP, like the content provider 108 or another POP 120, the edge server 230 would become the master for its POP 120 such that other edge servers 230 in the same POP would use the master edge server 230 found during peer discovery rather than getting the content externally. Other edge servers 230 receiving a request for the content object would find the master edge server 230 using peer discovery.

Although this embodiment chooses a single edge server 230 other embodiments could assign the same content object request to multiple edge servers 230 on different occasions. To balance the load, for example, a variable number of edge servers 230 could be selected for a particular request such that they shared the delivery load. An edge server 230 without a particular content object could act as a relay to get the content object from a peer or neighboring edge server. The number of relay edge servers for a group of content object requests is configurable based on a number of factors, for example, stream name, customer name, service type, customer preference, number of edge servers, loading of edge servers, etc.

Figure 3:
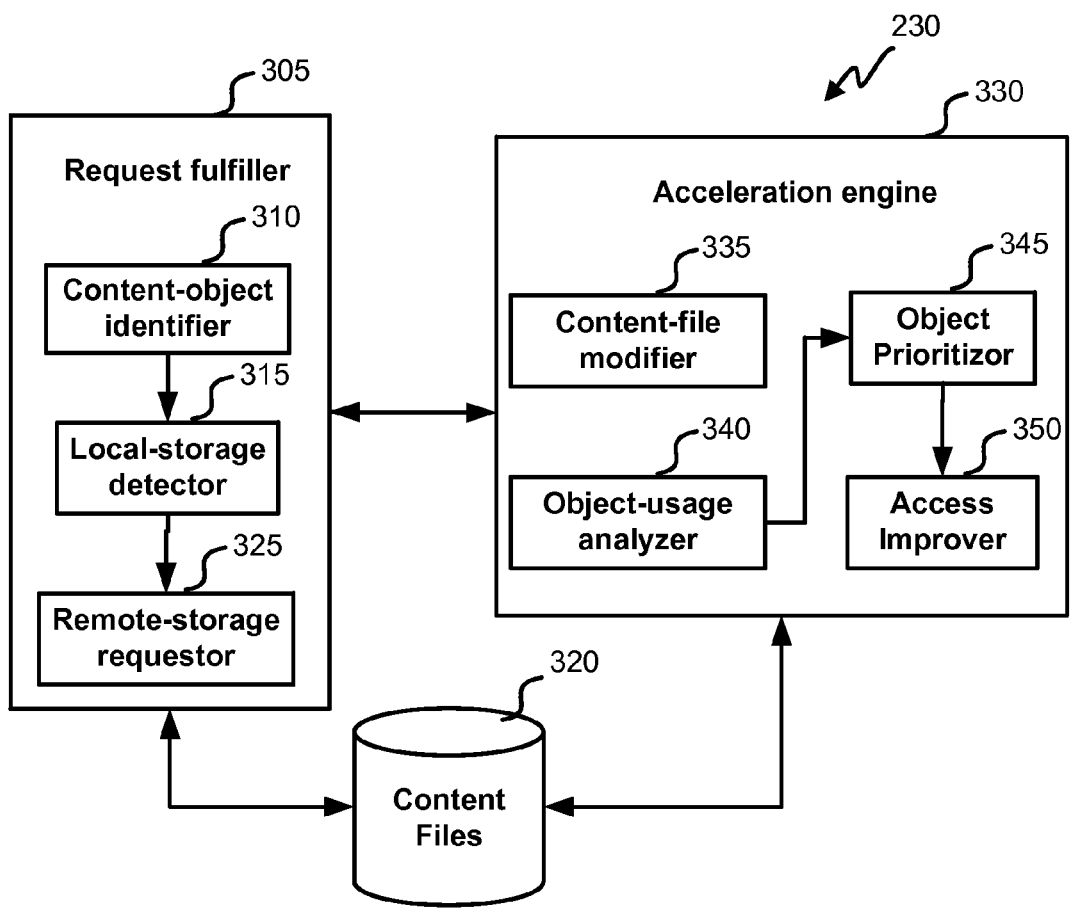
FIG. 3 depicts a block diagram of an embodiment of an edge server.

Referring next to FIG. 3, a block diagram of an embodiment of an edge server 230 is shown. Edge server 230 includes a request fulfiller 305 that receives a request from an end user system 102 for one or more content objects. For example, an end user system 102 may be requesting content objects associated with a Uniform Resource Locator (URL) or Hypertext Transfer Protocol.

The request fulfiller may include a content-object identifier 310 that identifies content objects associated with the request. For example, a request for a webpage may in fact being requesting a plurality of content objects, such as HTML code for the webpage, included style sheets, images, Javascripts, etc. In some instances, it may not be possible to (at least initially) identify more than one content objects. For example, determining content objects associated with an HTML code may require first receiving and parsing the HTML code. However, in some embodiments, the associated content objects may be determined, e.g., based on past requests. For example, multiple previous requests may have been received for the same content object, and it may be determined that specific content objects were frequently or always requested shortly after the initial request. Thus, the subsequently requested content objects may be associated with the initial content object and identified by the content-object identifier 310 upon receiving a request for the initial content object.

The request fulfiller 305 may further include a local-storage detector 315 that detects whether one or more content objects are stored in a local storage or cache. For example, the local-storage detector 305 may determine whether a content-file database 320 includes one or more of the identified content objects. Local-storage detector 315 may include a look-up table or algorithm that indicates files stored in the database 320, or local-storage detector 315 may check whether specific content files are in the content-file database 320 (e.g., by requesting the content files).

The request fulfiller 305 may further include a remote-storage requestor 325 that may request one or more content objects from a remote source. For example, the one or more content objects may be requested from another server (e.g., an edge server 230) in a same POP 120, another server (e.g., an edge server) in a different POP 120, an edge server 230, non-edge server, or an origin server 112. The remote-storage requestor 325 may determine where to transmit a request, e.g., by consulting a storage hierarchy, by consulting a storage look-up table, by consulting results of previous content-object remote requests, etc. In some instances, the remote-storage requestor 325 requests the one or more content objects after it has been determined (e.g., by the local-storage detector 315) that the one or more content objects are not stored locally.

The edge server may further include an acceleration engine 330 that tailors content-object request strategies, caching strategies and/or transmission strategies in order to accelerate loading and/or execution of important one or more content objects (e.g., content objects desired to be quickly or frequently used on a webpage) on an end user system 102.

The acceleration engine 330 may include a content-file modifier 335 that modifies one or more content files in order to determine use properties of a content object defined by the content file itself or referenced within (e.g., called by) the content file. The content file modified may include a requested content file (e.g., an HTTP file) or a content file associated with a requested content file (e.g., a script or function called by an HTTP file). For example, the modified content file may include a document.write or document.writeln function called by a script within or referenced by an HTTP file. The content-file modifier 335 may modify the content file to determine, e.g., with respect to one or more content objects (defined by the content file itself or referenced the content file): how the content objects are displayed to a user (e.g., near a top or bottom of a webpage), how frequently content objects are used, how quickly content objects are used, a delay associated with requesting and receiving the content object, etc. In some instances, the file modification allows the content-file modifier 335 to determine which additional content objects are associated with the content file (e.g., subsequently requested and rendered as a result of a script). The content-file modification may allow the content-file modifier to determine properties associated with content objects not directly identified in the content file itself (e.g., dynamically identified by a script).

The acceleration engine 330 may include an object-usage analyzer 340 that analyzes properties related to when, how and how frequently specific content objects are used, as described further below. For example, the object-usage analyzer 340 may determine how frequently a content object was used or accessed and when it was used or accessed. The object-usage analyzer 340 may determine this information, e.g., based on reports received from end-user devices (e.g., as a result of the content-file modification) or by detecting subsequent requests from the same end user system 102.

Based on the analyzed properties of content objects, an object prioritizor 350 may identify priorities associated with one or more content objects, as described further below. Frequently and/or quickly used content objects may be highly prioritized. Other factors may further influence the priorities, such as transmission time, estimated content-object importance (e.g., prioritizing objects that allow webpage functionality, objects that allow proper webpage appearance, or objects that provide content to be presented), object size, etc.

The acceleration engine 330 further includes an access improver 350 that improves access to one or more content objects. For example, the access improver may speed up access of an end user system's access to high-priority content objects. High-priority content objects associated with a content file may be cached (e.g., at edge server 230, e.g., in the content-file database 320), pre-fetched, transmitted to an end-user system 102 prior to receiving a request for the high-priority content objects, embedded or inlined into an associated content file, etc. In one instance, upon receiving a request for an initial content object (e.g., an HTML file), access improver identifies high-priority content objects associated with the HTML file (e.g., images, scripts, other HTML files, etc.) and transmits the associated content objects to the end-user system 102 prior to receiving a request for the content objects (e.g., the high-priority content objects may be transmitted substantially simultaneously with the initial content object.)

Although this embodiment shows a single edge server 230 having multiple components, it will be understood that in some instances, the components may be present across a plurality of edge servers 230 (e.g., one edge server having the request fulfiller 305, another edge server having the acceleration engine 330, and either or both have the content-file cache 320).

While FIG. 3 shows a variety of components in an edge server 230, in some instances other types of systems or devices include one or more of the depicted components. For example, a server other than an edge server in the content distribution system 100 (e.g., origin server(s) 112, one or more end user system(s) 102, a server coupled to a plurality of edge servers 230 (e.g., at a POP), by a server coupled to a plurality of POPs 120, an edge server 230, etc.) may include all or part of the acceleration engine 330. In some instance, the content distribution system 100 includes a plurality of acceleration engines 230, which may or may not be located in parallel locations (e.g., at a plurality of edge servers or at an edge server and at an origin server).

It will be understood that edge servers (within a POP and/or across POPS) may have similar, same or different components and functionality. For example, in some instances, some edge servers include an acceleration engine 330 and some do not.

Figure 4:
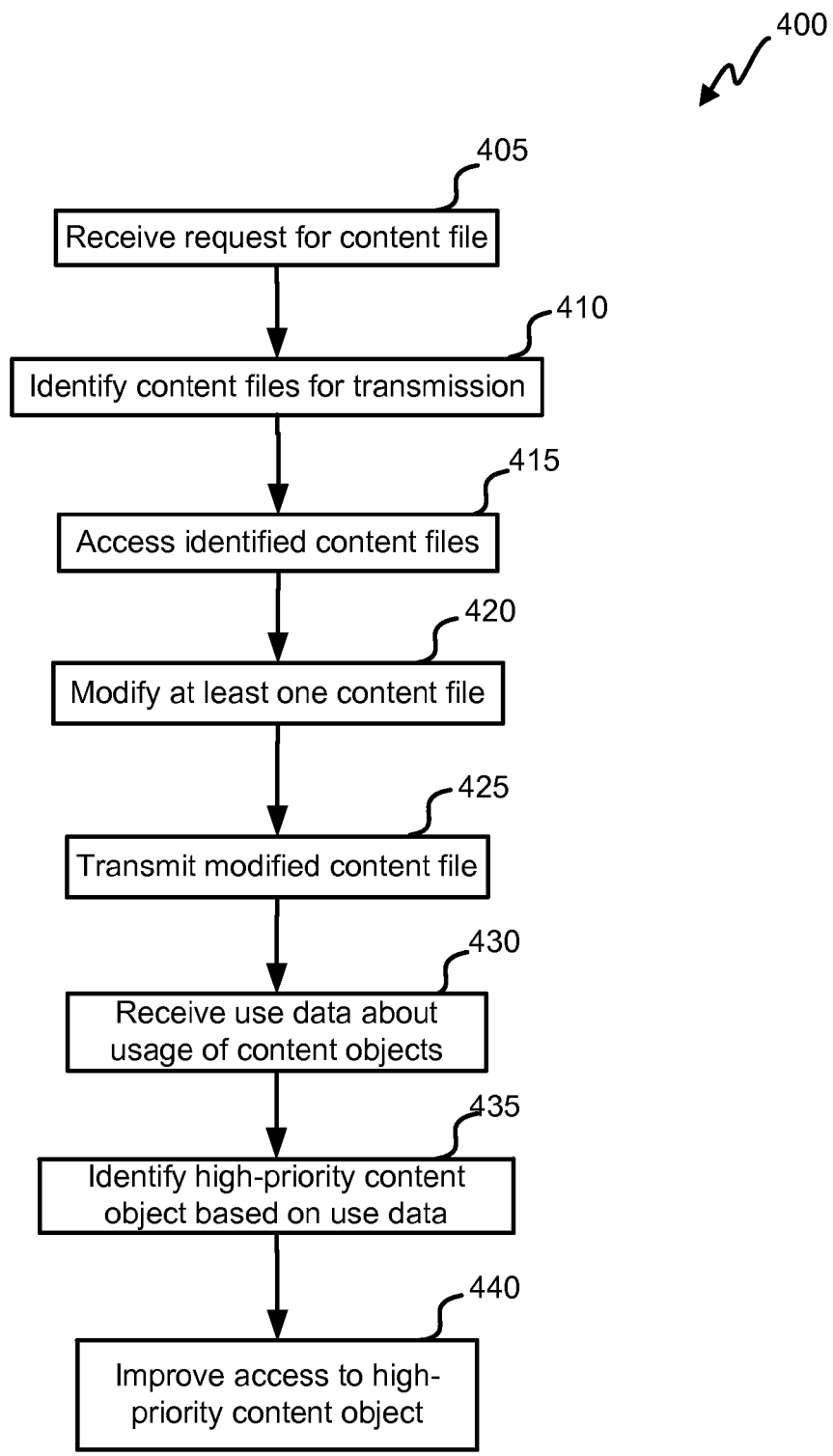
FIG. 4 illustrates a flowchart of an embodiment of a process for retrieving content objects.

With reference to FIG. 4, a flow diagram of an embodiment of a process 400 for retrieving content objects is shown. The depicted portion of the process begins at step 405 where a request for a content file is received (e.g., by an edge server 230 and/or from an end-user system 102). The requested content file may be associated with and/or at least partly define a webpage. The requested content file may comprise, e.g., an HTTP or HTML code and/or a script.

At block 410, one or more content files are identified transmissions (e.g., by the content-object identifier 310). The one or more content files may include the requested content file. In some instances, the one or more content files additionally or alternatively include other content files, such as scripts or other HTTP codes called by and/or otherwise associated with the requested content file. The other content files may be identified, e.g., based on a previous analysis of a similar or same requested content file and/or based on previously received use reports. For example, standard dynamic-webpage functions (e.g., document.write or document.writeln) may be associated with dynamic-webpage HTTP codes.

At block 415, at least one of the identified content files are accessed (e.g., by the local-storage detector 315 and/or remote-storage requestor 325). The content files may be accessed, e.g., from a local cache and/or from a remote cache or storage. At block 420, at least one of the content files are modified e.g., by the content-file modifier 335). The modification may cause an end-user system 102 that executes the modified content file to report data back to an edge server 230. At block 425, the at least one modified content file is transmitted (e.g., by the request fulfiller 305 to the end-user system 102) in response to the request. Additional content files (e.g., content files identified at block 410 but not modified) may also be transmitted.

At block 430, use data is received (e.g., by the object-usage analyzer 340), the use data indicating usage of one or more content objects. The one or more content objects may or may not include content objects associated with the content files identified at block 410 and/or associated with the modified content file. In some instances, the one or more content objects include content objects called or requested subsequent to rendering of a webpage associated with the modified content file. In some instances, the one or more content objects include content objects called or requested via execution of the modified content file.

At block 435, at least one high-priority content object is identified (e.g., by the object prioritizor 345) based at least in part on the use data. For example, frequently used or quickly used content objects may be highly prioritized. The high-priority content object may be identified based at least in part on the use data associated with the request received at block 405 and at least in part on one or more other similar requests (e.g., for similar content files, for content files associated with similar content objects, etc.). It will be understood that reference to "use" of a content object herein may indicate, e.g., presenting (e.g., a text-based or image content object), executing (e.g., a script), calling or including (e.g., a style sheet), etc.

At block 440, access to the at least one high-priority content object is improved (e.g., by the access improver 350). The access may be improved, e.g., by caching the high-priority content object at an edge server, transmitting the high-priority content object to an end user system 102 prior to a request for the content object, revising a content file to definitively include the high-priority content object (e.g., via embedding or inlining) rather than including it in a dynamic script, etc.

Figure 5:
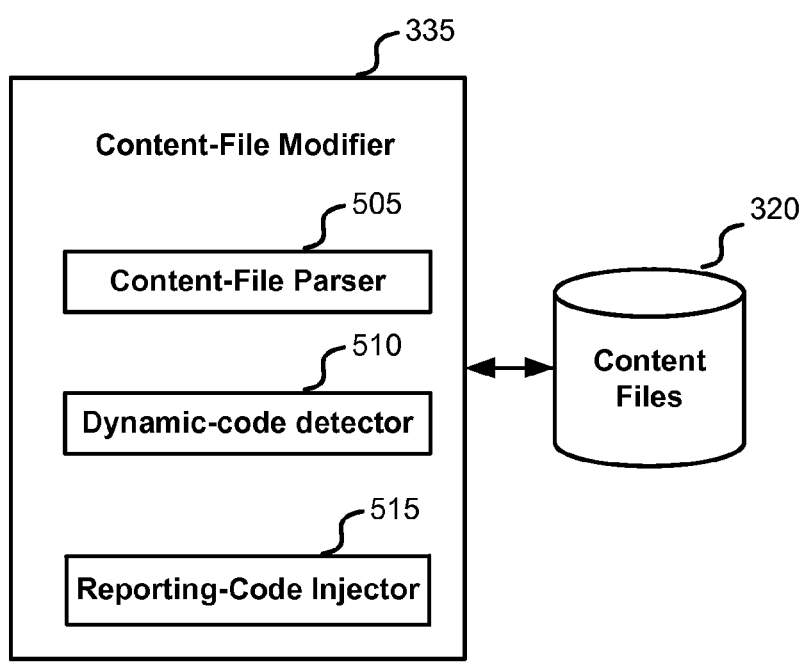
FIG. 5 depicts a block diagram of an embodiment of a content-file modifier.

Referring next to FIG. 5, a block diagram of an embodiment of the content-file modifier 335 is shown. A content file modified by content-file modifier 335 may be accessed, e.g., by intercepting the content file while the content file is being transmitted to another location. Thus, for example, the request fulfiller 305 may have requested the content file from an origin server, and the content-file modifier 335 may detect a response to the request and intercept the content file.

In some instances, a content file is accessed from the content-file database 320. The content-file database 320 may include original and/or modified content files. Original and/or modified content files may be associated with storage locations, naming conventions, associated identifiers (e.g., in the content file or in an index of content files), etc. in order to convey a modification status. The content-file database 320 may or may not be stored locally with respect to the content-file modifier 335. In some instances, one or more content-file databases 320 are located at each of a plurality of edge servers.

The content file may include a file written in a markup language (e.g., HTML), a scripting language and/or a style-sheet language (e.g., Cascading Style Sheets). The content file may include an HTTP file. The content file may include one or more embedded or inlined content objects or references (e.g., calls) to content objects. The content file may comprise a code, such as a code written in a markup language (e.g., Dynamic HTML or HTML). The content file may be modified prior to a compiling of the content file. The content file may comprise a single file or a set of files. The content file may comprise a webpage-defining file.

The content-file modifier 335 includes a content-file parser 505. The content-file parser 505 may identify functions called (directly or indirectly) by the content file or content objects referenced or included within the content file. For example, the content-file parser 505 may identify inline content-object links (e.g., to images), embedded content objects (e.g., by scanning for tags), internal scripts, referenced functions, etc. In some instances, the content-file parse may identify portions of the content file (e.g., portions of an HTML code).

Content-file modifier includes a dynamic-code detector 510 that determines whether a content file includes or uses a dynamic code, such that different content objects may be presented to different users. Dynamic codes may be structured such that it is difficult or impossible to determine, a priori, which content objects will or even might be used, e.g., during rendering of a webpage. The dynamic-code detector 510 may access the parsed content file and determine whether a portion of the content file indicates or suggests that the content file is or is associated with a dynamic code. For example, it may be determined, e.g., whether the content file includes or references a script (e.g., a script generally, a Javascript, a client-side script, a script with particular features, a script that calls specific functions, a script that includes a document.write function or document.writeln, etc.).

The content-file modifier 335 includes a reporting-code injector 515, which identifies a target code and injects a reporting code into the content file. The reporting code may be added, e.g., to a dynamic code, scripting file, base code (e.g., that references or includes other content files but is not itself referenced or included by other content files), a secondary content file (e.g., referenced or included by a base content file), a script function, a traditional content file (e.g., a document.write or document.writeln function), a custom content file, a content file requested by an end-user system and/or a content file associated with a content file requested by an end-user system. For example, the reporting-code injector 515 may identify that a detected dynamic code will likely use the document.write or document.writeInfunction (e.g., based on its dynamic characterization, use of a Javascript generally, use of a particular type of script, etc.) or may specifically detect a call to the document.write or document.writeInfunction. The document.write or document.writeln function may then be identified as the target code.

The reporting-code injector 515 may then inject a reporting code in the target code. The reporting code may include instructions to generate data indicating, e.g., when the target code was called, when a portion of the target code was executed, one or more parameters sent to the target code, an output of the target code and/or one or more content objects identified or presented by the target code. For example, a reporting code injected into a document.write or document.writeInfunction may instruct the function to generate data noting which parameters were input into the function and when the function was called. This information may indicate any identity of content objects presented to a user and when the presentations occurred.

The reporting code may further include instructions to format the data and/or transmit the data (e.g., to the edge server 230). The reporting code may further include transmission conditions (e.g., that new parameters were received or that at least a specific amount of time has passed since a previous transmission). Thus, for example, a reporting code injected into a document.write or document.writeIn function may instruct the function to generate a report identifying parameters received in the last 2 minutes and transmit the report to the edge server 230 (or to another destination, such as another edge server 230).

The reporting code may be injected, e.g., towards a beginning of the content file, near calls to functions, near references to content objects, near embedded objects, etc. In some instances, multiple reporting codes are injected (e.g., in multiple content files or a same content file). In some instances, the reporting code includes multiple conditions or instruction dependencies. For example, instructions may indicate that a first type of data is to be collected when a script causes text to be displayed (e.g., the data identifying that text generally is being displayed) and a second type of data is to be collected when a script presents a content object (e.g., the data identifying the content object).

In some instances, the reporting code includes instructions to identify content objects currently loaded, displayed, and/or being executed. The reporting code may include instructions to further identify where (e.g., along a y-axis), within a webpage, the content objects are displayed. For example, some content objects may be displayed within a top portion of the page that is immediately viewable to a user, and other content objects may be displayed within a bottom portion of the page that is only viewable to the user upon scrolling down the page. By identifying web-page placement of content objects and tracking scrolling inputs, a determination may be made as to whether specific content objects of the webpage are currently within a field of view.

The modified content file may be stored, e.g., in a content-file database (such as content-file database 320) at an end user system, at a POP, at an edge server, at an origin server, etc. The modified content file may be stored in a local or remote location. With respect to the content-file modifier 335. In some instances, multiple versions of the modified content file are saved. For example, the modified content file may be generated at or near the origin server, and copies of the modified content file may then be stored at a plurality of (or each) POP within a CDN or at a plurality of (or each) edge server within a CDN. Copies may then be revised independently from each other and/or in a global manner.

The modified content file may be transmitted, e.g., to an end user system. For example, the modified content file may be transmitted to an end user system that requested the content file or that requested another content file associated with the modified content file. The modified content file may include a same or different name as compared to a name of an unmodified version of the content file.

Figure 6:
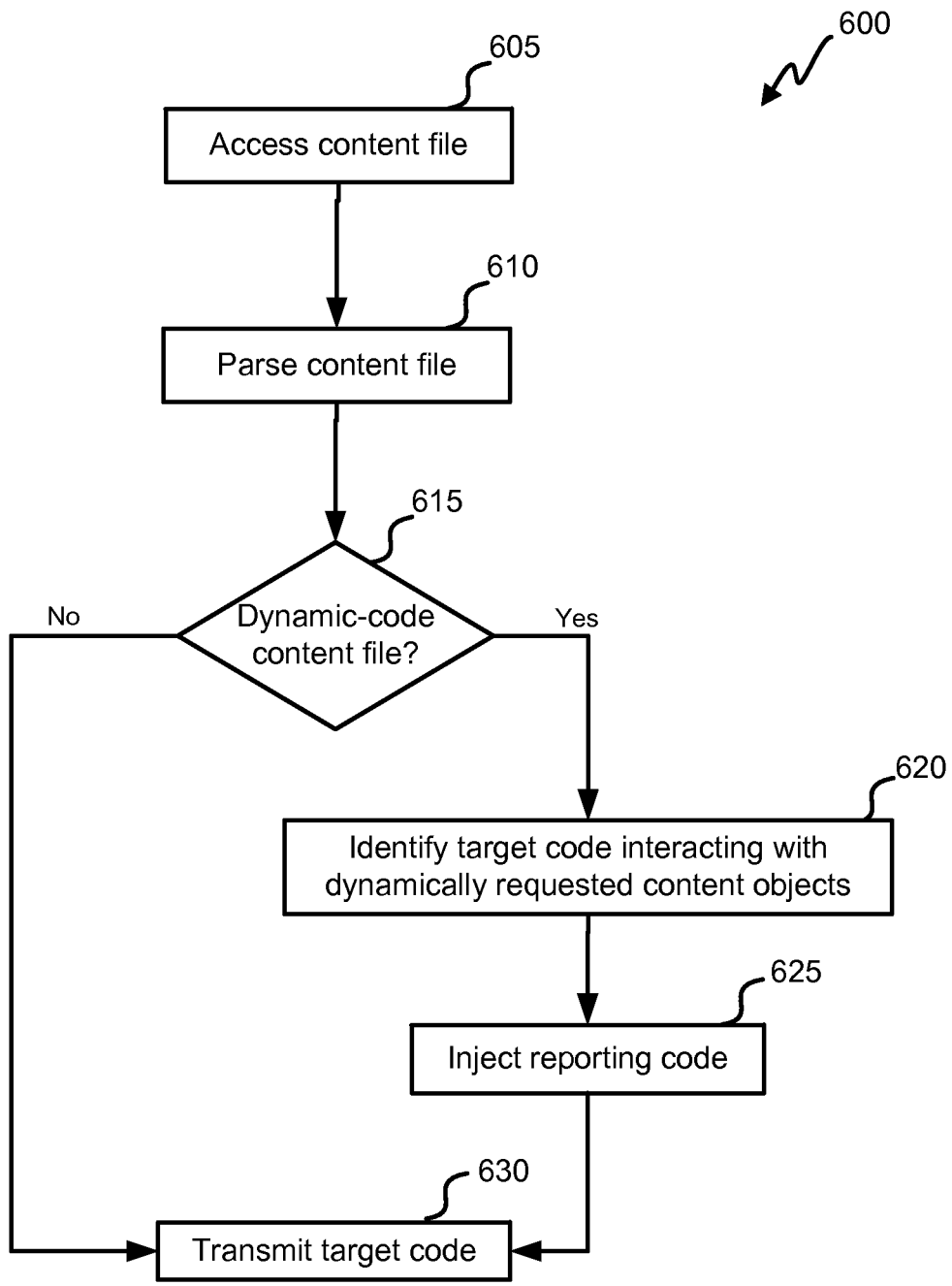
FIG. 6 illustrates a flowchart of an embodiment of a process for generating a modified content file.

With reference to FIG. 6, a flow diagram of an embodiment of a process 600 for generating a modified content file is shown. The depicted portion of the process begins in step 605 where the content-file modifier 335 accesses one or more content files (e.g., received by the from a remote source or accessed from a content-file database 320). At block 610, the content file is parsed (e.g., by content-file parser 505). The content file may be parsed, e.g., to identify internal scripts, links, function calls, file inclusions, etc. In some instances, multiple content files are parsed. For example, after an initial parsing, it may be determined that the initial content file includes a second content file. Thus, the second content file may be accessed and parsed.

A determination is made, at block 615, as to whether an accessed content file includes or is associated with a dynamic code (e.g., by the dynamic-code detector 510). If the content file does not include and/or is not associated with a dynamic code, then the process continues to block 630, and the modified file is transmitted (e.g., to an edge server, end user system, etc.).

If the content file includes and/or is associated with a dynamic code, then processing continues to block 620, at which a target code interacting with dynamically requested content objects is identified (e.g., by reporting-code injector 515). The identified target code may include a code that, e.g., dynamically identifies, requests (e.g., from the content delivery network 110), formats, or presents (e.g., to an end-user system 102) a content object. The target code may be known or estimated to be included or called by the dynamic-code content file. The target code may be included in or may be, e.g., a function or a script.

At block 625, a reporting code is injected into the target code (e.g., by reporting-code injector 415). The reporting code may be, e.g., injected at a beginning, middle or end of the code. The reporting code may be textually included in the code or a call or external inclusion may be added from the target code to a discrete reporting code. At block 630, the modified target code is transmitted (e.g., to an end-user system). The modified target code may be included in a requested content file and/or may be transmitted substantially simultaneously to transmission of a requested content file.

Figure 7:
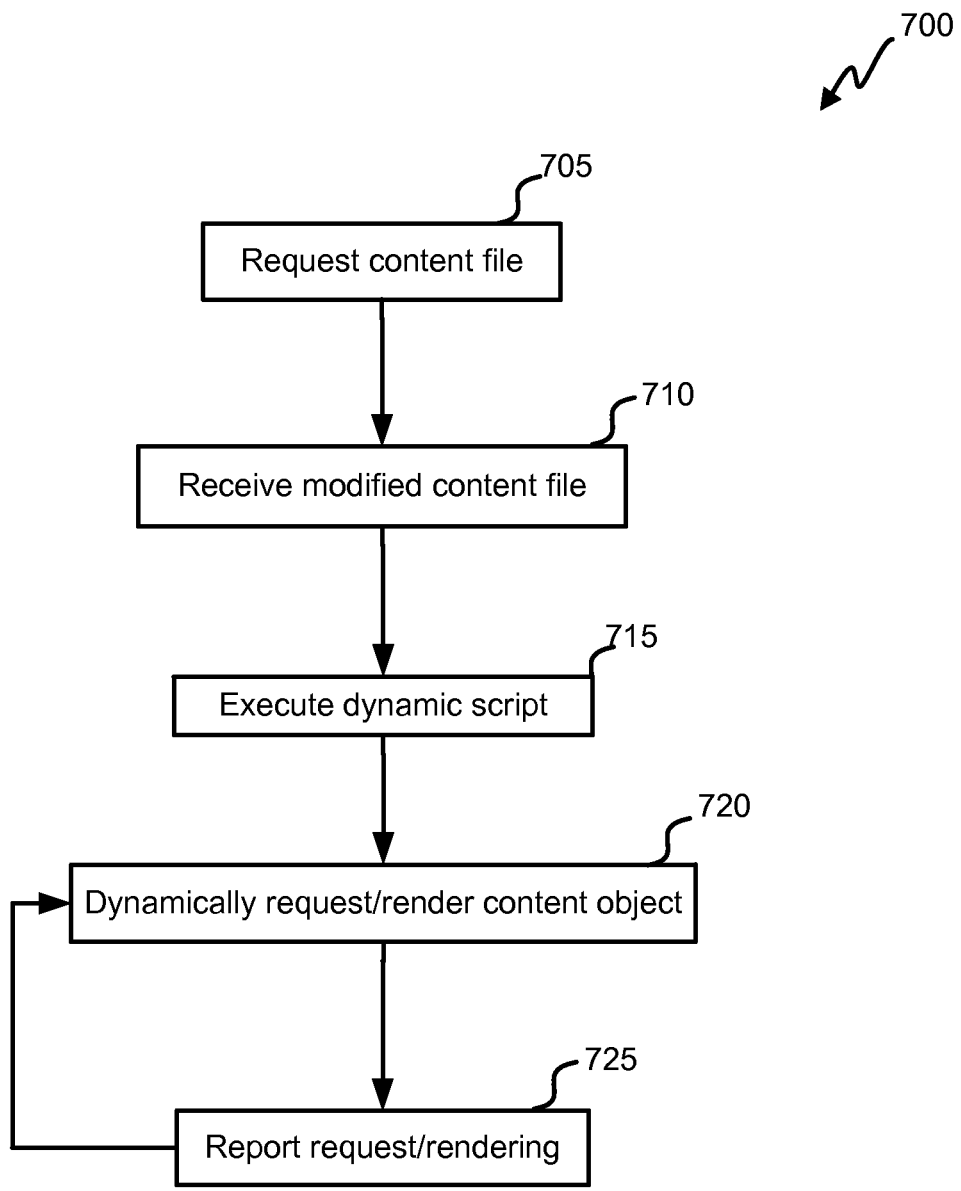
FIG. 7 illustrates a flowchart of an embodiment of a process for reporting content-object use.

With reference to FIG. 7, a flow diagram of an embodiment of a process 700 for reporting content-object use is shown. The depicted portion of the process begins in step 705 where a content file (e.g., a webpage) is requested. For example, an user 128 may enter a uniform resource locator (URL), click on a hypertext link, etc. The request may be transmitted, e.g., from an end user system 102 associated with the user 128 over a network (e.g., the Internet 104) to a POP 120. The request may be assigned to an edge server 230 at the POP.

In response to the request, at block 710, a modified content file may be received by an end user system 102. For example, an edge server 230 may receive and modify the requested content file in accordance with process 600 depicted in FIG. 6 and transmit the file to the end user system 102, or an origin server may access and modify the requested content file in accordance with process 600 depicted in FIG. 6 and transmit the file to the end user system 102 via an edge server. In some instances, the end user system 102 receives an unmodified content file and itself modifies the file, e.g., in accordance with process 600 depicted in FIG. 6.

At block 715, a dynamic script associated with the modified content file is executed. For example, the modified content file many include a dynamic script or may be called by a dynamic script. Execution of the dynamic script may result in dynamically determined content objects to be presented. Thus, at block 720, one or more content objects are dynamically requested or rendered. For example, the dynamic script may process inputs (e.g., from the user 128 or from external sources) and identify or select one or more content objects to be presented. In instances in which the identified content objects are not locally available, the content objects may be requested (e.g., from the content delivery network 110). In some instances, the content objects are locally available (e.g., in a cache) or are locally generated (e.g., generating an image based on inputs). The dynamically determined content objects may then be rendered.

At block 725, the request and/or rendering of the content objects may be reported (e.g., to an edge server 230). For example, report data may indicate which content objects were rendered, when they were rendered and/or where (within a webpage) they were presented. The reporting may be a result of a reporting-code injected into the modified content file. Process 700 may involve repetition of blocks 720-725, such that content objects may be repeatedly dynamically requested and/or rendered and report data identify the dynamic use of the content objects may be repeatedly collected and transmitted.

Figure 8:
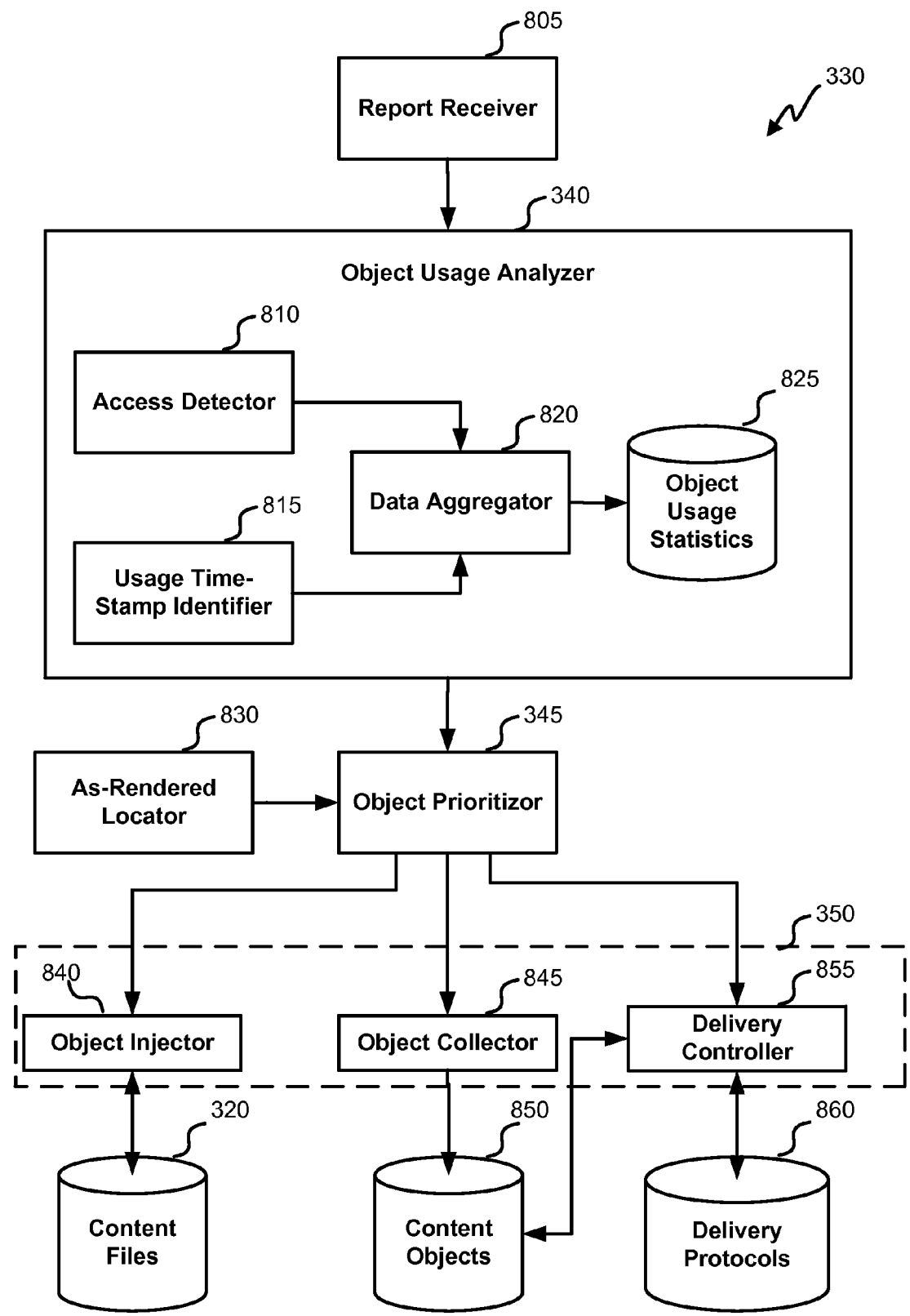
FIG. 8 depicts a block diagram of an embodiment of an acceleration engine.

Referring next to FIG. 8, a block diagram of an embodiment of an acceleration engine 330 is shown. In the depicted embodiment, the acceleration engine 330 does not include a content-file modifier 335. The content-file modifier may, e.g., be present in another acceleration engine. In some embodiments, the acceleration engine 330 as depicted in FIG. 8 further includes the content-file modifier 335. The acceleration engine 330 may be present in and/or coupled to any of a variety of components in the content distribution system 100. For example, in some instances, the acceleration engine 330 may be implemented by each of a plurality of edge servers 230 (e.g., that respond to requests from users 128) at each of a plurality of POPs 120. Other implementations are possible. For example, the acceleration engine 330 may be implemented by the origin server(s) 112, by one or more end user system(s) 102, by a server coupled to a plurality of edge servers 230 (e.g., at a POP), by a server coupled to a plurality of POPs 120, etc. In some instance, the content distribution system 100 includes a plurality of acceleration engines 330, which may or may not be located in parallel locations (e.g., at a plurality of edge servers or at an edge server and at an origin server).

The acceleration engine 330 includes a report receiver 805, which receives reporting data identifying usage patterns as they pertain to one or more content files. The reports may indicate, e.g., which content objects were accessed, properties of accessed content objects (e.g., the type of object), when content objects were accessed, how content objects were accessed and/or how content objects were presented. The reports may include, e.g., one or more time stamps, such as a time stamp associated with: a request for a content file, with receipt of the content file, display of a webpage associated with the content file to a user, etc. The time stamp may include an absolute time or a relative time (e.g., relative to a time of a request for the content file). The reports may include client-side information that, e.g., is would not otherwise be available to the content delivery network 110 without the reporting data. For example, the reports may include information regarding client-side generated content objects, appearance of dynamic webpages, times at which content objects (e.g., previously transmitted to the end-user system 102) are presented, etc.

The reports may include details about an end-user system, such as a browser used to display content in the content file, an operating system, a type of device, etc. Reports may be received from one or more users 102 and/or end user systems 128. In some embodiments, end user systems 128 that were served a content file (or a modified version thereof) from an edge server or from an origin server (e.g., via an edge server) send reports to the edge server 230 or to the origin server 112. Reports may also be received from parallel or higher level network components. For example, a report receiver 610 at a first edge server 230-1 may receive reports from a second edge server 230-2 (which may have received the reports from an end user system 102).

The acceleration engine 330 includes an object usage analyzer 340, which analyzes the reports received by the report receiver 805. The analysis may be performed, e.g., for one, more or each content object: identified in at least one report associated with a requested content file or webpage associated with the report, transmitted to the end-user system in response to a request for a report-related webpage, that may be possibly displayed on a report-related webpage, etc. The object usage analyzer 340 may determine whether, how frequently, when and/or how the content object was accessed.

An access detector 810 may determine whether a content object associated with a content file was accessed generally or within a particular time period. Access to the content object may be in the received reports or may be inferred based on data in the reports. For example, the access detector 810 may detect access to a content object when a report indicates that a dynamic script identified, generated or selected the content object or when a presentation or processing function received the content object.

A usage time-stamp identifier 815 may determine temporal information related to access of the content object. For example, the usage time-stamp identifier 815 may identify an absolute time of access of a content object or a relative time of access of a content object (e.g., relative to a display of a corresponding webpage, request for the content file, etc.). The usage time-stamp identifier 815 may identify an order of access to content objects. For example, a user may have accessed Content Object #1 first, Content Object #5 second, and Content Object #10 third.

Outputs from the access detector 810 and/or from the usage time-stamp identifier 815 may be aggregated across reports by the data aggregator 820. Data aggregator 820 may determine, e.g., outputs corresponding to a same or similar content file (e.g., being generated based on data from one or more reports) and aggregate the data. Thus, for example, the aggregated data may include data received from reports generated from a plurality of end user systems 128. The data may be aggregated, e.g., in a cumulative manner or in a time-binned manner.

One or more object usage statistics, stored in an object-usage-statistics database 825, may be generated based on the aggregated data. The object usage statistics may or may not include variables specific to a same or similar content file (e.g., URL). The object usage statistics may be specific to content objects. The object usage statistics may indicate, e.g., a frequency at which a content object was accessed, information pertaining to a relative time at which the content object was accessed (e.g., a mean time of access with respect to a time of a request for an associated content file), dependencies on locality or end-user-system variables (e.g., browsers, edge server locations, etc.), etc.

Based at least partly on the analysis performed by the object usage analyzer 340, an object prioritizor 345 then prioritizes content objects. The prioritization may include ranking at least two of the content objects, assigning the content objects to groups based on priorities, etc.

In one instance, the prioritization comprises identifying one or more rarely-requested content objects. The rarely-requested content objects may comprise content objects associated with statistics identifying a low count of accesses and/or a low frequency of accesses. Thus, a count or frequency of access may be compared to an absolute threshold (e.g., identifying content objects requested fewer than 50 times or fewer than 50 times per month). A count or frequency of access may be compared to a relative threshold (e.g., identifying content objects for which access counts were less than 5% as compared to a maximum access count; identifying content objects for which access counts' contribution to a content-file's total access to count to all content objects was less than 1%, identifying content objects that were not amongst the top 20 most requested content objects, etc.). In one instance, the prioritization comprises determining which content objects are accessed quickly and which content objects are accessed after a delay.

Generally, frequently requested content objects may be prioritized over rarely requested content objects, and quickly accessed content objects may be prioritized over content objects accessed after a delay. However, other factors may further influence prioritization, such as: size of content objects, bandwidth consumption of transmitting the content object, estimated download time associated with the content object, use of a content object in multiple content files, popularity of an associated content file, etc.

In some instances, the prioritization depends at least partly on an actual or predicted location of one or more content objects within a webpage as rendered. For example, a reporting code in a modified content file may instruct an end user system to collect (in a raw or processed form) information about a location of one or more content objects (e.g., including those defined inside iframes) with respect to a rendered, e.g., webpage. The information may be transmitted in a raw or processed form to an as-rendered locator 830. The information may itself comprise location estimates or the as-rendered locator 830 may estimate locations based on the data. Objects may be prioritized at least in part based upon the estimated location (e.g., prioritizing objects based on their position with respect of the Y-axis, such that top-positioned objects are assigned relatively high priorities).

The prioritization may be performed globally or for a particular set of data. For example, the prioritization may be specific to a content file (e.g., ranking content objects embedded in the content file), to a user characteristic (e.g., browser or user device), to a type of content object (e.g., Javascripts or images), etc. A location of the acceleration engine 330 may further influence a specificity of the prioritization. For example, an acceleration engine 330 located at an edge server and/or only receiving reports associated with one edge server may identify object prioritizations specific to the edge server. Thus, in some embodiments, acceleration engines 330 may be included within a content-delivery system 100, and multiple object prioritizations may be determined. In some instances, prioritization schemes vary across different prioritizations. For example, in some embodiments, prioritizations of images depend upon their as-rendered locations, while prioritizations of Javascripts do not.

The acceleration engine 330 may include an access improver 350 to improve access to content objects assigned high priorities by the object prioritizor 345. In some instances, the access improver 350 coordinates automatic loading of the content objects assigned a high priority and/or identifies an order for automatically loading of the content objects based upon priorities. Thus, if a request for a content file is received after a prioritization performed by the object prioritizor 350, content objects assigned high priorities (e.g., and predicted to be frequently used and/or used quickly) may be quickly or immediately available to a user following rendering, e.g., of a webpage. This may be accomplished by, e.g., revising a content file (e.g., to include a content object code), automatically transmitting another file and/or high-priority content objects in response to subsequent content-file requests, and/or caching high-priority content objects near end-user systems 128 (e.g., at one, more or all edge servers 230).

In some instances, content files (e.g., stored in the content-file database 320) are modified. For example, an object injector 840 may inject content objects (e.g., high-priority content objects) and/or code associated with the content objects (e.g., load instructions, direct links, local links, etc.) into the modified content files. Thus, accessing the high-priority content objects may be more direct and result in faster access. In some instances, at least a portion of a dynamic code or a reference to a dynamic code is removed.

As another example, a content file may be rearranged such that HTML-code content objects are ordered and/or segmented according to a priority. HTML code portions producing webpage portions viewed first may be associated with a high priority and pulled towards a top of an HTML code. HTML code portions producing infrequently viewed webpage portions may be associated with a low priority, and pushed towards a bottom of an HTML code or segmented into a separate HTML file called by the initial HTML code.

In some instances, high priority objects are collected by an object collector 845. The collected content objects may be stored or cached, e.g., in a content-object database 850. The content-object database 850 may be located, e.g., at an edge server. Thus, requests for a content file may result in requests sent to fewer, e.g., origin servers, and the speed required to respond a request for the content object may be reduced.

A delivery controller 855 may further generate and/or adapt one or more delivery protocols (e.g., stored in a delivery-protocol database 860) to improve access to high-priority content objects. For example, high-priority content objects may be automatically transmitted to an end user system 102 upon receiving a request for an associated content file. The automatically transmitted content objects may further be divided into multiple groups (to allow for multiple simultaneous transmissions) and/or ordered (e.g., within a group) to improve the quick availability of high-priority content objects.

Figure 9A:
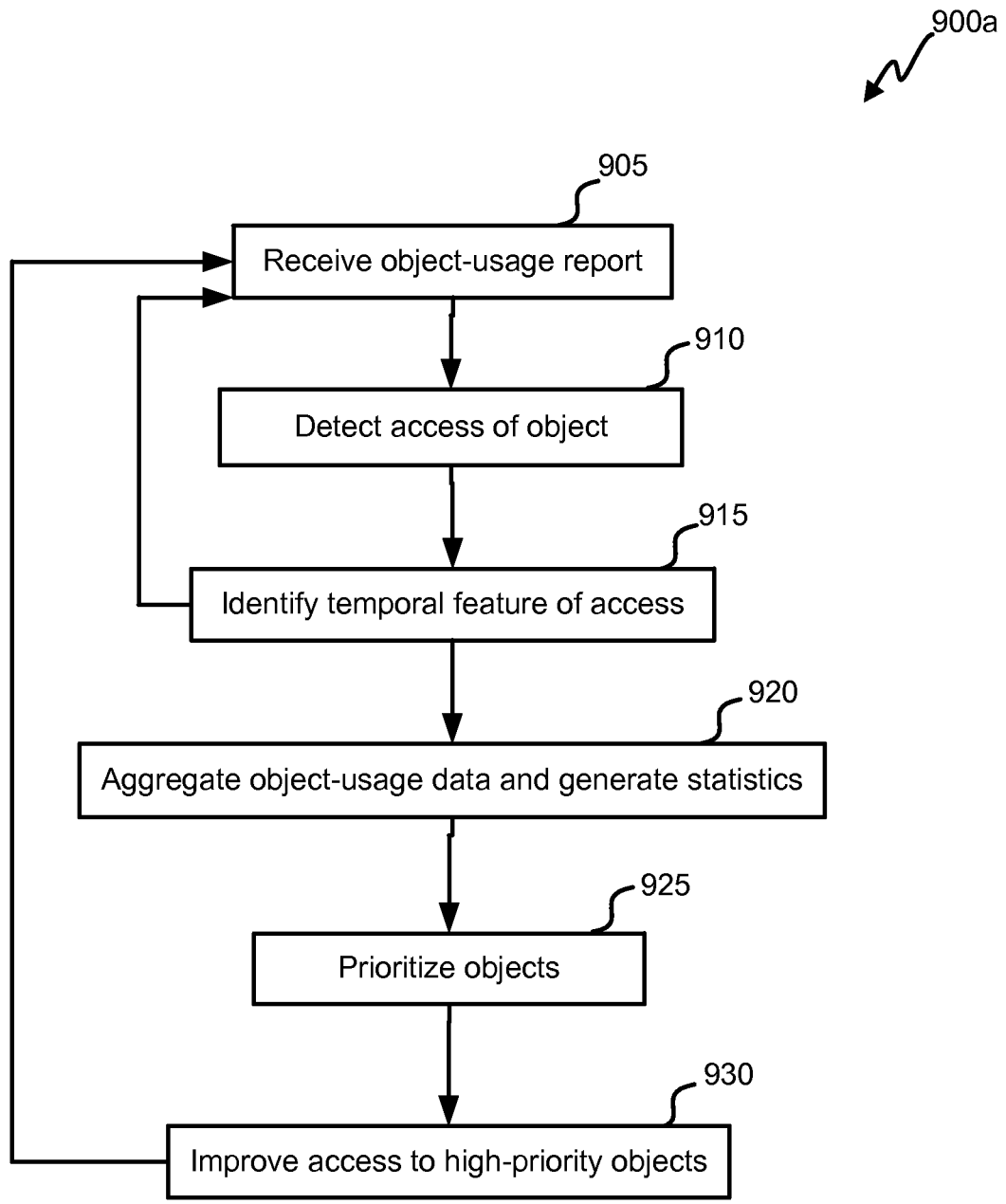
FIGS. 9a and 9b illustrate flowcharts of embodiments for prioritizing content objects.

With reference to FIG. 9a, a flow diagram of an embodiment of a process 900a for prioritizing content objects is shown. The depicted portion of the process begins in step 905 where an object-usage report is received by the report receiver 805. The object-usage report may include data identifying, e.g., that an object was identified by a script, that an object was received by a function, that an object was presented or requested, or that an object was otherwise accessed or interacted with. The received report may include information about when the one or more content objects were accessed.

The access detector 810 detects, at block 910, access of one or more content objects based on data in the received report. The usage time-stamp identifier 815 identifies, at block 915, temporal features related to access of one or more content objects. Blocks 905-915 may be repeated to accumulate data pertaining to a content file. Subsequently or simultaneously, at block 920, the data aggregator 820 aggregates the object-usage data (e.g., including detected access and/or identified temporal features) and generates usage statistics.

Based at least in part on the generated usage statistics, the object prioritizor 345 prioritizes objects (e.g., associated with a particular content file or a group of content files, such as a dynamic webpage) at block 925. At block 930, an access improver 350 improves (e.g., hastens) access to high-priority objects. The process 900a may be repeated, such that objects are dynamically and frequently prioritized. Further the process 900a may be performed in real-time or near real-time. Thus, no separate training period is necessary, and objects may be prioritized and access to objects adjusted nearly immediately after a content file is available over a network.

Figure 9B:
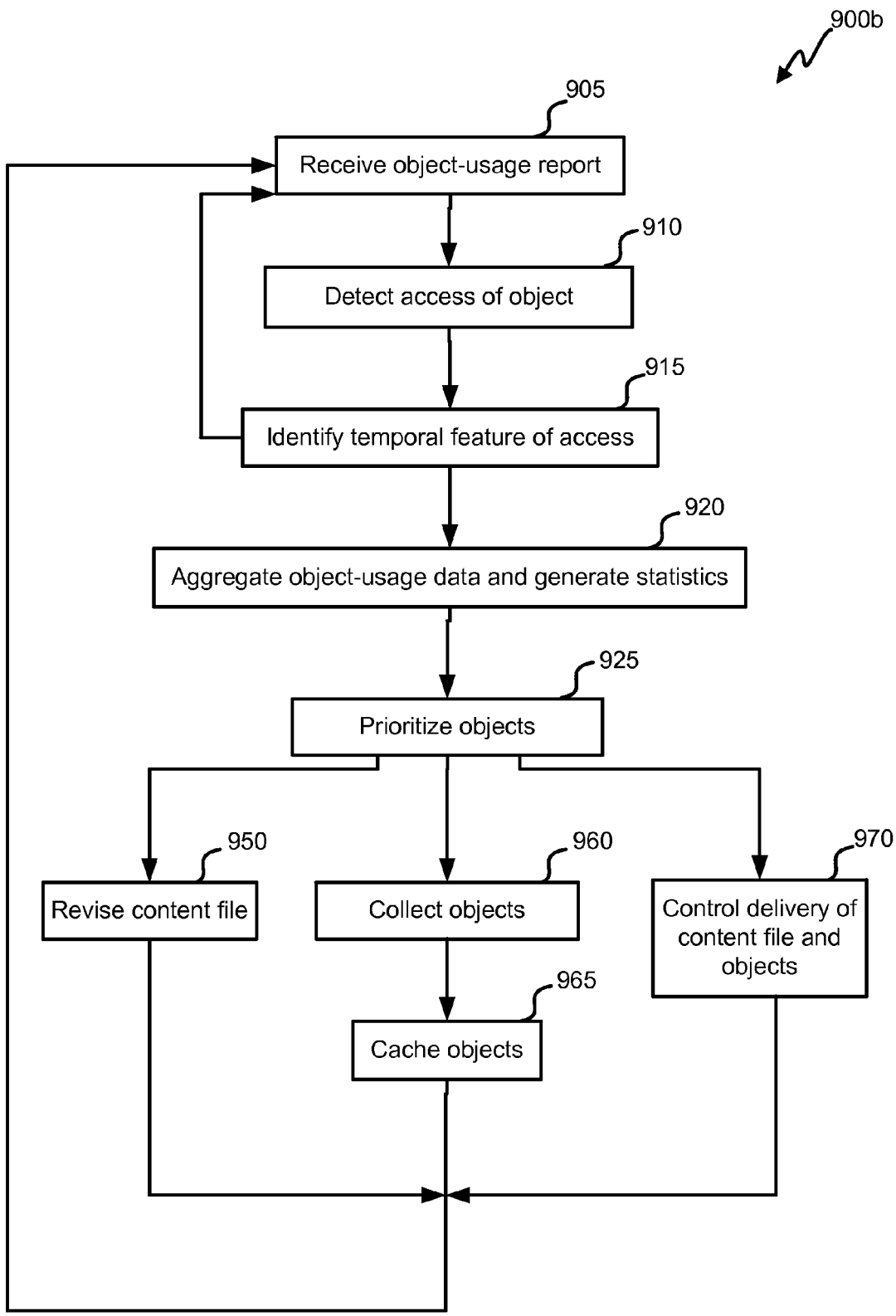

With reference to FIG. 9b, a flow diagram of an embodiment of a process 900b for prioritizing content objects is shown. Many blocks parallel those in FIG. 9a, and pertinent related disclosures are contemplated for this embodiment as well. FIG. 9b shows examples of how access to high-priority objects may be improved at block 930 in FIG. 9a.

At block 950, a content file may be revised. For example, the object injector 840 may inject a high-priority content object and/or code associated with a high-priority content object (e.g., a Javascript function, a direct and/or local link, etc.) into a content file and/or may remove at least some of a dynamic code in or associated with the content file. As another example, a content file may be reorganized such that high-priority portions (e.g., file-portion content objects) or high-priority calls or towards a top of the content file. As another example, a content file may be segmented such that low-priority content objects (e.g., HTML code or an embedded object) are reorganized into a separate code that is called by the revised content file.

At block 955, the object collector 845 may collect high-priority objects. The collected high-priority objects may be cached, at block 765, e.g., at a local server or edge server in a content-object database. At block 970, the delivery controller 855 may control delivery of the content file and of content objects. For example, the delivery controller 855 may determine which content objects to transmit with the content file and/or to transmit automatically upon receiving a request for the content file. The delivery controller 855 may further determine an order of transmission of content objects, a number of simultaneous downloads (of content objects) to initiate, compiling conditions, etc.

Thus, some embodiments herein provide accelerating measures for dynamic code. Dynamic codes are traditionally associated with unpredictable content-object usage and may result in repeated content-object requests (e.g., as a result of multiple iterations or nested script structures). Serving each request individually is time consuming, delays users' access to content, and wastes processing power on the server and client side.

Meanwhile, embodiments herein allow for a server-side device to identify client-side usage and/or to determine how a dynamic code is operating. Thus, the outputs of the dynamic code become more predictable. Based on this information, frequently used content objects may be made quickly available for use. For example, the content objects may be cached near an end-user system 128 or transmitted to an end-user system 128 prior to receiving a request. Processing may be saved on the client side, as an end-user system 128 may identify that a particular content object is already available locally and may therefore not need to transmit a request for the object. As another example, high-priority content objects are removed from dynamic code features and statically injected into a content file (e.g., via a Javascript). The end-user system then need not, e.g., process conditionalities pertaining to the content file. Thus, relevant portions of webpages may be quickly presented to users, and resource consumption may be reduced.

Figure 10:
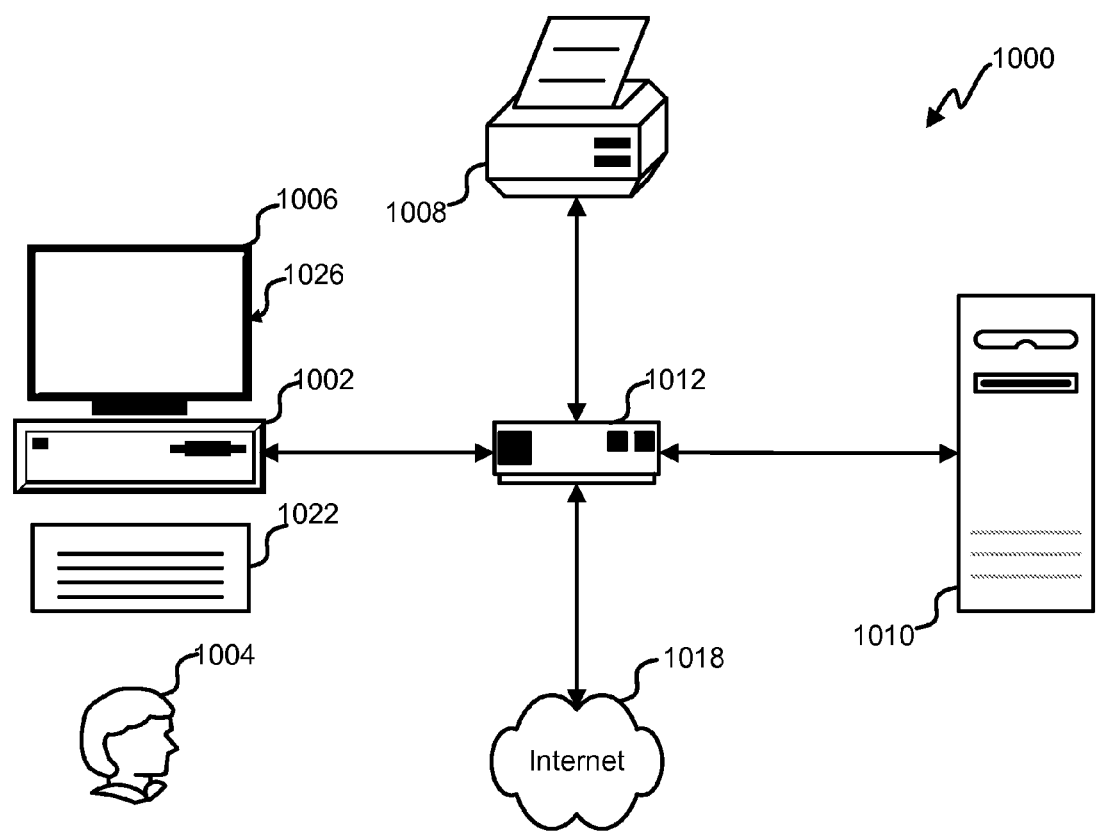
FIG. 10 depicts a block diagram of an embodiment of a computer system.

Referring next to FIG. 10, an exemplary environment with which embodiments may be implemented is shown with a computer system 1000 that can be used by a designer 1004 to design, for example, electronic designs. The computer system 1000 can include a computer 1002, keyboard 1022, a network router 1012, a printer 1008, and a monitor 1006. The monitor 1006, processor 1002 and keyboard 1022 are part of a computer system 1026, which can be a laptop computer, desktop computer, handheld computer, mainframe computer, etc. The monitor 1006 can be a CRT, flat screen, etc.

A designer 1004 can input commands into the computer 1002 using various input devices, such as a mouse, keyboard 1022, track ball, touch screen, etc. If the computer system 1000 comprises a mainframe, a designer 1004 can access the computer 1002 using, for example, a terminal or terminal interface. Additionally, the computer system 1026 may be connected to a printer 1008 and a server 1010 using a network router 1012, which may connect to the Internet 1018 or a WAN.

The server 1010 may, for example, be used to store additional software programs and data. In one embodiment, software implementing the systems and methods described herein can be stored on a storage medium in the server 1010. Thus, the software can be run from the storage medium in the server 1010. In another embodiment, software implementing the systems and methods described herein can be stored on a storage medium in the computer 1002. Thus, the software can be run from the storage medium in the computer system 1026. Therefore, in this embodiment, the software can be used whether or not computer 1002 is connected to network router 1012. Printer 1008 may be connected directly to computer 1002, in which case, the computer system 1026 can print whether or not it is connected to network router 1012.

Figure 11:
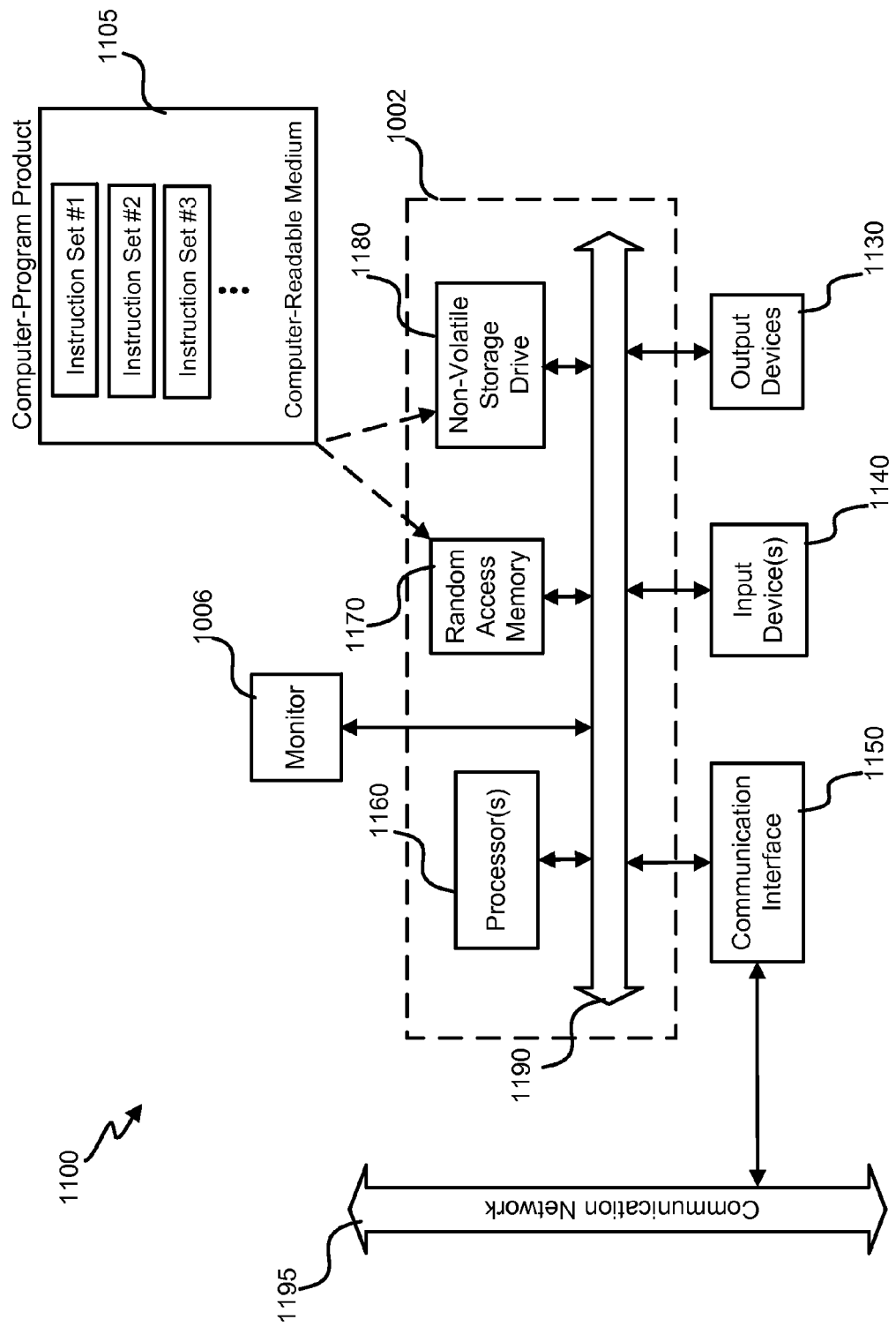
FIG. 11 depicts a block diagram of an embodiment of a special-purpose computer.

With reference to FIG. 11, an embodiment of a special-purpose computer system 1100 is shown. For example, one or more of content-modifying system 300, object-delivery system 600, delivery controller 650 may be a special-purpose computer system 1100. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1026, it is transformed into the special-purpose computer system 1100.

Special-purpose computer system 1100 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1100 to perform the above-described methods. Computer 1002 may include one or more processors 1160 that communicate with a number of peripheral devices via a bus subsystem 1190. These peripheral devices may include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 may be stored in non-volatile storage drive 1180 or another computer-readable medium accessible to computer 1002 and loaded into memory 1170. Each processor 1160 may comprise a microprocessor, such as a microprocessor from Intel® or Advanced Micro Devices, Inc.®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft Corporation, Solaris® from Sun Microsystems, LINUX, UNIX, and the like.

User input devices 1140 include all possible types of devices and mechanisms to input information to computer system 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These may include a display (e.g., monitor 1006), printers, non-visual displays such as audio output devices, etc.

Communications interface 1150 provides an interface to other communication networks and devices and may serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 may be coupled to a computer network, to a FireWire® bus, or the like. In other embodiments, communications interface 1150 may be physically integrated on the motherboard of computer 1002, and/or may be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 may be configured to store the basic programming and data constructs that provide the functionality of various embodiments of the present invention, as described above.

Software instruction sets that provide the functionality of the present invention may be stored in RAM 1170 and non-volatile storage drive 1180. These instruction sets or code may be executed by the processor(s) 1160. RAM 1170 and non-volatile storage drive 1180 may also provide a repository to store data and data structures used in accordance with the present invention. RAM 1170 and non-volatile storage drive 1180 may include a number of memories including a main random access memory (RAM) to store of instructions and data during program execution and a read-only memory (ROM) in which fixed instructions are stored. RAM 1170 and non-volatile storage drive 1180 may include a file storage subsystem providing persistent (non-volatile) storage of program and/or data files. RAM 1170 and non-volatile storage drive 1180 may also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem may utilize multiple busses or communication paths within the computer 1002.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for serving dynamic content objects to end user systems, the system comprising:
   a request fulfiller that:
      receives, using a computer processor, a request for a webpage from an end-user system, the webpage including a set of content objects,
      retrieves a content file that defines the requested webpage, wherein the webpage is a dynamic webpage and the content file references a dynamic code that is structured such that whether each of the set of content objects is presented on the webpage via the end user system is not fixed across presentations of the webpage,
      receives a modified content file from a content-file modifier, and
      transmits the modified content file to the end-user system;
   the content-file modifier that generates the modified content file, the content-file modifier comprising:
      a dynamic-code detector that detects that the webpage is dynamic by determining that the retrieved content file references the dynamic code; and
      a reporting-code injector that creates the modified content file by injecting a reporting code into the retrieved content file to produce the modified content file, the reporting code including instructions to report data identifying which content objects of the set of content objects were presented on the webpage via the end user system,
   an object-usage analyzer that receives reported data identifying which content objects of the set of content objects were presented on the webpage via the end user system and analyzes the reported data in real-time;
   an object prioritizor that:
      identifies, based on the analysis of the reported data, a first content object of the set of content objects identified in the reported data as having been presented on the webpage,
      identifies, based on the analysis of the reported data, a second content object of the set of content objects missing from the reported data as having not been presented on the webpage,
      determines that the first content object is of higher priority than the second content object, and
      adds content object code to the content file, the content object code including instructions to:
         automatically request a third content object of the set of content objects, wherein the third content object is to be initially presented on the dynamic webpage within a field of view,
         determine that a fourth content object of the set of content objects is initially positioned on the dynamic webpage at a location not within a field of view, track scrolling inputs in real-time to determine when the fourth content object reaches the field of view, and request the fourth content object; and an access improver that improves access, by using a webpage acceleration technique, of at least one other end-user system to the first content object relative to the second content object based on determining that the first content object is of higher priority than the second content object.

2. The system for serving dynamic content objects to end user systems of claim 1 wherein one or more edge servers of a content delivery network comprises the content-file modifier and object prioritizor.

3. The system for serving dynamic content objects to end user systems of claim 1 wherein the reporting code is injected into an additional content file directly or indirectly called by the content file.

4. The system for serving dynamic content objects to end user systems of claim 1 wherein the dynamic code includes a script.

5. The system for serving dynamic content objects to end user systems of claim 1 wherein the reporting-code instructions comprise instructions to report parameters received by a presentation function.

6. A method for serving content objects, the method comprising:

receiving a plurality of reports from a plurality of end-user systems, each report of the plurality of reports identifying which content objects of a set of content objects were presented on a same dynamic webpage at a respective end-user system, wherein the dynamic webpage is configured such that whether each of the set of content objects is presented on the dynamic webpage via an end user system is not fixed across presentations of the webpage;

aggregating data from the plurality of reports, wherein the aggregated data comprises an object-usage statistic indicating how frequently a content object of the set of content objects was presented on the webpage;

determining that a first content object of the set of content objects is of higher priority than a second content object of the set of content objects based on the second content object missing more frequently in the plurality of reports as compared to the first content object, the aggregated data showing the first content object as more frequently being presented on the webpage as compared to the second content object;

adding content object code to a content file defining the dynamic webpage, the content object code including instructions to:

automatically request a third content object of the set of content objects, wherein the third content object is to be initially presented on the dynamic webpage within a field of view, determine that a fourth content object of the set of content objects is initially positioned on the dynamic webpage at a location not within a field of view, track scrolling inputs in real-time to determine when the fourth content object reaches the field of view, and request the fourth content object; and improving, by using a webpage acceleration technique, an end-user system's access to the first content object relative to the second content object based on the determining that the first content object is of higher priority than the second content object.

7. The method for serving content objects as recited in claim 6 wherein improving the end-user system's access to the first content object comprises caching the first content object on an edge server in a content delivery network.

8. The method for serving content objects as recited in claim 6 wherein improving the end-user system's access to the first content object comprises transmitting the first content object to the end user system prior to the end-user system requesting the first content object.

9. The method for serving content objects as recited in claim 6 wherein improving the end-user system's access to the first content object comprises modifying the content file defining the dynamic webpage to include a non-dynamic reference to the first content object.

10. The method for serving content objects as recited in claim 6 further comprising:

modifying the content file defining the dynamic webpage to include a reporting function that includes instructions to report data identifying which content objects of the set of content objects were presented on the webpage via the end user system, wherein the plurality of reports are received as a result of execution of the reporting function.

11. A method for responding to a request for a webpage, the method comprising:

receiving, from an end-user system, a request for a content file that defines a webpage, the webpage including a set of content objects;

retrieving the content file, the content file referencing a dynamic code that is structured such that whether each of the set of content objects is presented on the webpage via the end user system is not fixed across presentations of the webpage;

detecting that the content file references the dynamic code and thus that the webpage is a dynamic webpage;

producing a modified content file by injecting a reporting function into the content file, wherein:

the reporting function includes instructions to collect and report data identifying which content objects of the set of content objects were presented on the webpage via the end user system;

transmitting the modified content file to the end-user system;

receiving a report based on execution of the reporting function that identifies a first content object of the set of content objects that was presented on the webpage;

identifying a second content object of the set of content objects that is missing from the report as having not been presented on the webpage;

determining the first content object is of higher priority than the second content object;

adding content object code to the content file, the content object code including instructions to:

automatically request a third content object of the set of content objects, wherein the third content object is to be initially presented on the dynamic webpage within a field of view, determine that a fourth content object of the set of content objects is initially positioned on the dynamic webpage at a location not within a field of view, track scrolling inputs in real-time to determine when the fourth content object reaches the field of view, and request the fourth content object; and improving access, by using a webpage acceleration technique, of at least one other end-user system to the first content object relative to the second content object based on determining that the first content object is of higher priority than the second content object.

12. The method for responding to the request for the webpage as recited in claim 11 wherein the reporting function is injected into a standard Javascript function.

13. The method for responding to the request for the webpage as recited in claim 11 wherein the reporting function is injected into a document.write or document.writeln function.

14. The method for responding to the request for the webpage as recited in claim 11 further comprising parsing the content file to identify references to content objects wherein the detection that the webpage references the dynamic code depends on what types of referenced content objects were identified.

15. The method for responding to the request for the webpage as recited in claim 11 wherein the reporting function includes instructions to collect and report data further indicating when content objects were presented on the webpage via the end user system.

* * * * *